United States Patent
Lee et al.

(10) Patent No.: US 10,068,131 B2
(45) Date of Patent: Sep. 4, 2018

(54) METHOD AND APPARATUS FOR RECOGNISING EXPRESSION USING EXPRESSION-GESTURE DICTIONARY

(71) Applicant: INDUSTRY-ACADEMIC COOPERATION FOUNDATION, YEUNGNAM UNIVERSITY, Gyeongsangbuk-do (KR)

(72) Inventors: Chan Su Lee, Daegu (KR); Ja Soon Jang, Daegu (KR)

(73) Assignee: INDUSTRY-ACADEMIC COOPERATION FOUNDATION, YEUNGNAM UNIVERSITY, Gyeongsanbuk-do (KR)

( * ) Notice: Subject to any disclaimer, the term of this patent is extended or adjusted under 35 U.S.C. 154(b) by 182 days.

(21) Appl. No.: 15/114,445

(22) PCT Filed: Jan. 29, 2014

(86) PCT No.: PCT/KR2014/000834
§ 371 (c)(1),
(2) Date: Jul. 27, 2016

(87) PCT Pub. No.: WO2015/115681
PCT Pub. Date: Aug. 6, 2015

(65) Prior Publication Data
US 2016/0342828 A1   Nov. 24, 2016

(30) Foreign Application Priority Data
Jan. 28, 2014 (KR) .......... 10-2014-0010160

(51) Int. Cl.
*G06K 9/00* (2006.01)
*G06K 9/62* (2006.01)

(52) U.S. Cl.
CPC ..... *G06K 9/00315* (2013.01); *G06K 9/00288* (2013.01); *G06K 9/627* (2013.01); *G06K 9/6255* (2013.01)

(58) Field of Classification Search
CPC .......... G06K 9/00315; G06K 9/00288; G06K 9/6255; G06K 9/627
(Continued)

(56) References Cited

U.S. PATENT DOCUMENTS

| 8,462,996 B2 * | 6/2013 | Moon ............... G06K 9/00315 351/203 |
| 2009/0285456 A1 | 11/2009 | Moon et al. |
| 2010/0189358 A1 | 7/2010 | Kandeda et al. |

FOREIGN PATENT DOCUMENTS

| WO | 2011-155902 A1 | 12/2011 |
| WO | 2012-139269 A1 | 10/2012 |
| WO | 2013-042992 A1 | 3/2013 |

OTHER PUBLICATIONS

International Search Report for PCT/KR2014/000834.

* cited by examiner

*Primary Examiner* — Amandeep Saini
(74) *Attorney, Agent, or Firm* — The PL Law Group, PLLC (57) ABSTRACT

An apparatus for recognizing expression using an expression-gesture dictionary, includes a learning image acquisitor to obtain data from a learning expression, perform a normalization based on the data, track a change of a dense motion from a reference frame, and generate expression learning data, an expression-gesture dictionary and expression-gesture dictionary learner to represent and store a numerical value for expression recognition for each expression using a local support map in an image coordinate space for a motion flow with respect to a set of changes of the (Continued)

dense motion, an expression classifier learner to learn an expression classification for each expression based on a weight of data on the expression-gesture dictionary, a recognition image acquisitor to obtain data from a recognition target, and generate recognition data, and an expression recognizer to analyze an expression weight on the recognition data, and recognize an expression by the expression classifier learner.

7 Claims, 6 Drawing Sheets

(58) Field of Classification Search
USPC .......................................................... 382/103
See application file for complete search history.

METHOD AND APPARATUS FOR RECOGNISING EXPRESSION USING EXPRESSION-GESTURE DICTIONARY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2014/000834, filed Jan. 29, 2014, which claims priority to the benefit of Korean Patent Application No. 10-2014-0010160 filed in the Korean Intellectual Property Office on Jan. 28, 2014, the entire contents of which are incorporated herein by reference.

TECHNICAL FIELD

The following description relates to a method and apparatus for recognizing an expression using an expression-gesture dictionary capable of recognizing an expression of a person by sensing a change of the expression on a face.

BACKGROUND ART

A facial expression is one of the most natural communication methods transmitting a person's emotions and thoughts. A facial expression can express an emotion more quickly than when people express their feelings using words or realize their own feelings.

For example, various emotions are expressed using a change of positions of a mouth, eyes, and eyebrows.

Many studies regarding facial recognition are underway as a method for understanding a person's emotions, and recently, many studies for implementing different gestures according to each person's emotions in a personalized device such as a smart phone are underway, and studies on an interaction of a person and a robot including a service robot are actively proceeding.

Studies for allowing a robot to express various reactions according to a person's emotions are underway as part of these studies.

Accordingly, technology capable of precisely recognizing a change of an expression on a face and effectively recognizing a classification of an emotion is required.

As a conventional art regarding the technology, a method of applying an artificial neuron algorithm to a histogram-matched facial image through a normalization of lighting to recognize a facial expression is disclosed in Korea Patent No. 10-1084298.

SUMMARY

The present invention is directed to providing an apparatus and method for recognizing an expression by calculating a change of an expression on a face from an obtained image and automatically classifying the expression of the face.

The present invention is further directed to providing an apparatus and method for recognizing an expression in real time based on a local motion of a facial expression.

One aspect of the present invention provides an apparatus for recognizing an expression using an expression-gesture dictionary, including: a learning image acquisitor configured to obtain position data of a face and eyes from a learning expression, perform a first normalization based on the obtained position data, track a change of a dense motion of the learning expression from a reference frame of a neutral expression, and generate expression learning data; an expression-gesture dictionary learner configured to represent and store a numerical value for expression recognition for each expression according to a dictionary learning method satisfying a given limiting condition using a local support map in an image coordinate space for a motion flow with respect to a set of changes of the dense motion of the learning expression after initializing the expression-gesture dictionary; an expression classifier learner configured to learn an expression classification for each expression based on a weight of data on the expression-gesture dictionary; a recognition image acquisitor configured to obtain position data of a face and eyes from a recognition target, perform a second normalization based on the obtained position data, track a change of a dense motion of the recognition target from the reference frame of the neutral expression, and generate recognition data; and an expression recognizer configured to analyze an expression weight on data to be recognized, determine a closest classification by the expression classifier learner, and recognize an expression.

Further, the first normalization may remove a peripheral region regardless of an expression in a facial region by giving an offset as a predetermined ratio based on positions of two eyes after aligning a center of the two eyes to be a reference point based on positions of the two eyes which are detected, and set a position coordinate of a feature portion.

Moreover, the expression-gesture dictionary learner may obtain the numerical value for expression recognition by a method of obtaining an optimal value for an object function of the following equation according to a dictionary learning method, $$\min_{D,\alpha} \sum_{i=1}^{N} \|x_i - D\alpha_i\|_2^K + \sum_{k=1}^{K}\sum_{j=1}^{M} \Lambda_{ki}\|d_k^{(j)}\|_2$$

$$\text{s.t. } \max(\alpha_i) = 1, \alpha_i \geq 0$$

(Here, D is a numerical value of a dictionary to be obtained, $\alpha_i$ represents an i-th weight vector, $d_k^{(j)}$ represents a dimension of a j-th motion in a k-th dictionary column, K is the number of dictionaries which is set, M is a dimension of a gesture motion, $x_i$ is i-th motion data, N represents the amount of motion data used for learning, and $\Lambda_{ki}$ is a local support map in the k-th dictionary for an i-th sample).

The expression-gesture dictionary learner may obtain an optimal weight $\alpha_i$ by the following equation when a numerical value D of the expression-gesture dictionary is given, $$\min_{D,\alpha} \sum_{i=1}^{N} \|x_i - D\alpha_i\|_F^2 + \sum_{k=1}^{K}\sum_{j=1}^{M} \Lambda_{ki}\|d_k^{(j)}\|_2$$

$$\text{s.t. } \max(\alpha_i) = 1, \alpha_i \geq 0$$

(Here, $d_k^{(j)}$ represents a j-th motion dimension in a k-th dictionary column, K is the number of dictionaries which is set, M is a dimension of a motion, $x_i$ is i-th motion data, N represents the amount of motion data used for learning, and $\Lambda_{ki}$ represents a local support map in the k-th dictionary for an i-th sample.).

When a collection of given weight values is referred to as A, the expression-gesture dictionary learner may obtain a numerical value D of the expression-gesture dictionary by the following equation, $$\underset{D,\,Z}{\operatorname{argmin}} \|X - A \cdot D\|_F^2 + \Omega(Z)$$

$$\text{s.t. } D - Z = 0,\ \Omega(Z) = \sum_{k=1}^{K} \sum_{j=1}^{M} \Lambda_{ki} \|z_k^{(j)}\|_2.$$

Another aspect of the present invention provides a method for recognizing an expression using an expression-gesture dictionary, including: obtaining a learning image including obtaining position data of a face and eyes from a learning expression, performing a first normalization based on the obtained position data, tracking a change of a dense motion from a reference frame of a neutral expression, and generating expression learning data, wherein the first normalization aligns a center of two eyes to be a reference point based on positions of the two eyes which are detected, gives an offset as a predetermined ratio based on the positions of the eyes, removes a peripheral region regardless of an expression in a facial region, and sets a position coordinate of a feature portion; learning an expression-gesture dictionary including representing and storing a numerical value for expression recognition for each expression according to a dictionary learning method satisfying a given limiting condition using a local support map in an image coordinate space for a motion flow with respect to a set of changes of the dense motion for the learning expression after initializing the expression-gesture dictionary; learning an expression classifier including learning an expression classification for each expression based on a weight of data on the expression-gesture dictionary; obtaining a recognition image including obtaining position data of a face and eyes from a recognition target, performing a second normalization based on the obtained position data, tracking a change of a dense motion from the reference frame of the neutral expression, and generating recognition data; and recognizing an expression including analyzing an expression weight on data to be recognized, determining a closest classification by the expression classifier learner, and recognizing an expression.

Further, the learning of the expression-gesture dictionary may further includes a dictionary weight estimation operation after initializing the expression-gesture dictionary, wherein the estimating of the dictionary weight is performed based on a regeneration error test, and the regeneration error test obtains a combined weight of dictionary data obtained through dictionary learning and dictionary data on given original data, generates estimation data corresponding to the original data based on a component of each dictionary data and a value of the obtained combined weight, and obtains a difference between the estimation data and the original data.

Moreover, the learning of the expression-gesture dictionary may obtain the numerical value for expression recognition by a method of obtaining an optimal value for an object function of the following equation according to a dictionary learning method, $$\underset{D,\,\alpha}{\min} \sum_{i=1}^{N} \|x_i - D\alpha_i\|_2^K + \sum_{k=1}^{K} \sum_{j=1}^{M} \Lambda_{ki} \|d_k^{(j)}\|_2$$

$$\text{s.t. } \max(\alpha_i) = 1,\ \alpha_i \geq 0$$

(Here, D is a numeric value of a dictionary to be obtained, $\alpha_i$ represents an i-th weight vector, $d_k^{(j)}$ represents a dimension of a j-th motion in a k-th dictionary column, K is the number of dictionaries which is set, M is a dimension of a motion, $x_i$ is i-th expression-gesture data, N represents the amount of motion data used for the learning, and $\Lambda_{ki}$ is a local support map in the k-th dictionary for an i-th sample).

According to an embodiment of the present invention, an expression recognition method and apparatus which is robust to a change of lighting using motion flow and has reliability with respect to a rotation and a positional movement of a face, etc. through the normalization operation may be provided.

Further, calculation performance may be optimized based on an automatic modeling on localized motion, and real-time expression recognition may be provided.

According to an embodiment of the present invention, an expression may be effectively recognized in video, a plurality of images, etc. in which one or more images are given.

DETAILED DESCRIPTION

Embodiments of a method and apparatus for recognizing an expression using an expression-gesture dictionary according to the present invention will be described in detail with reference to the accompanying drawings. When describing the present invention with reference to the accompanying drawings, the same reference numeral will be allocated to the same or a corresponding component, and duplicate descriptions thereof will be omitted.

Further, the terms such as "first", "second", etc. used hereinafter are merely identification symbols for differentiating the same or corresponding components, and the same or corresponding components are not limited by the terms "first", "second", etc.

The present invention may be variously changed, have various embodiments, and will be described in detail through the detailed description with reference to the accompanying drawings illustrating specific embodiments.

However, this is not intended to limit to the specific embodiments, and it should be understood that other equivalents, modifications, and changes are included in the spirit and scope of the present invention.

In the following description of the present invention, when it is determined that a detailed description of a related well-known technology obscures the essence of the present invention, the detailed description thereof will be omitted.

According to an embodiment of the present invention, a method of extracting a change of a movement on a face according to an expression, learning an expression-gesture dictionary for locally expressing the extracted movement, and automatically recognizing the expression based on the learned expression-gesture dictionary is proposed.

Hereinafter, a detailed description for implementing the present invention will be described with reference to the accompanying drawings.

Figure 1:
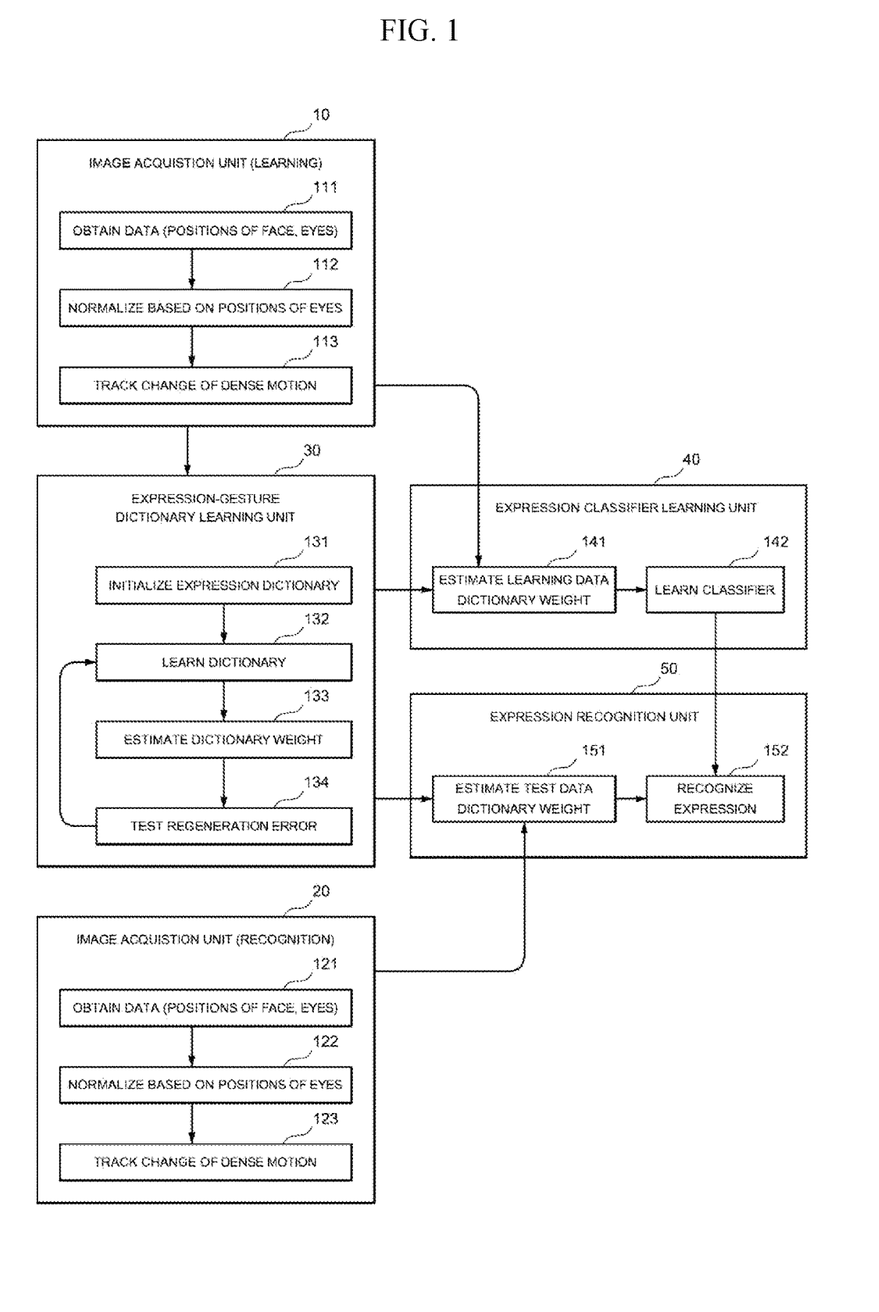
FIG. 1 is a block diagram illustrating an expression recognition apparatus using an expression-gesture dictionary according to an embodiment of the present invention.

FIG. 1 is a block diagram illustrating an expression recognition apparatus using an expression-gesture dictionary according to an embodiment of the present invention.

Referring to FIG. 1, an expression recognition apparatus 1 using an expression-gesture dictionary according to an embodiment of the present invention may include a learning image acquisitor (a learning image acauisition unit) 10, a recognition image acquisitor (a recognition image acquisition unit) 20, an expression-gesture dictionary learner (an expression-gesture dictionary learning unit) 30, an expression classifier learner (an expression classifier learning unit) 40, and an expression recognizer (an expression recognition unit) 50.

The learning image acquisitor 10 may obtain image data including positions of a face, eyes, etc. from a video image or a plurality of continuous still images.

After obtaining the image data S101, a normalizing S102 may be performed on an image from the obtained image data.

First, in the normalizing S102, the positions of the eyes may be detected from the obtained image data, and the obtained image data may be normalized to have the same distance and size as a reference image (or an initial image) so that the positions and the distance of the detected eyes are equal to a distance set according to a size of the image to be normalized.

Through the normalizing, a normalized expression may be obtained regardless of a change of the position due to a gesture or a movement of a head.

Figure 6:
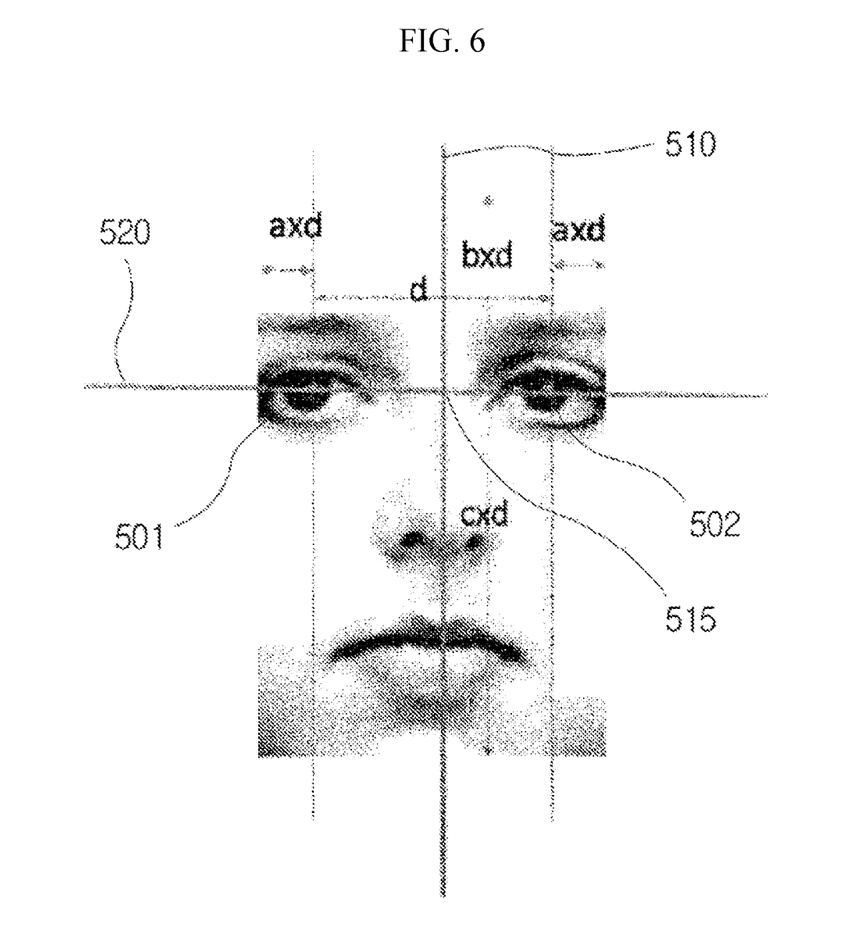
FIG. 6 is a diagram illustrating an example of image normalization according to an embodiment of the present invention.

FIG. 6 is a diagram illustrating an example of image normalization according to an embodiment of the present invention.

Referring to FIG. 6, the normalizing may set a center point 515 between eyes as a reference point based on positions of a detected left eye and right eye.

When a distance d of a left eye 501 and a right eye 502 based on X axis 520 positions of the set eyes is smaller than a distance of reference eyes which are set after being rotated so that the left eye and the right eye are horizontal, the image may be enlarged, and when the distance d is greater than the distance of the reference eyes, the image may be reduced. Accordingly, the image may be normalized to have the same distance as a reference value.

That is, when a detected facial image is great since the facial image is located closely, the detected facial image may be reduced so that the eyes are located in a reference position since the distance between the eyes is greater than the reference value.

Further, in the normalizing, an offset operation of normalizing a facial size according to an offset value may be included in order to set a region of the face based on the reference point (for example, an average of centers of two eyes).

In the offsettting, the face and background regions which are not relevant to the expression recognition may be removed.

The background region may be removed by symmetrically allocating an offset of d/2+ a×d in the X axis based on the distance d between two eyes in the face.

Further, the background region may be removed by allocating an offset of b×d in an upward direction of the eyes, and an offset of c×d in a downward direction of the eyes in a Y axis.

According to an embodiment of the present invention, when setting b=1, a ratio of a=0.25 and c=1.5 may be applied.

Further, the distance d between the eyes is set to be 50, positional coordinates of the left eye is set to be (−25, 0), and positional coordinates of the right eye is set to be (25, 0).

After the offset operation, a change tracking 103 may be performed.

The change tracking S103 may obtain a change of movements of dense points in order to obtain a change of a motion from the normalized image.

A dense motion change may track a change from a start frame (or another reference frame such as a neutral expression), extract the change, and generate and obtain expression learning data for recognizing the motion according to the expression.

In the expression-gesture dictionary learner 30, with respect to data of the dense motion change obtained for learning, an expression-gesture dictionary is taught to recognize an expression based on a classification of each expression according to a dictionary learning method which satisfies a predetermined limiting condition.

For this, after an initializiing S131 of the expression-gesture dictionary, a dictionary learning operation S132 and a dictionary weight estimating operation S133 may be performed on the expression-gesture dictionary based on a regeneration error check S134.

Here, the regeneration error check S134 may obtain a combined weight of dictionary data obtained through the dictionary learning and directory data on predetermined original data, and generate data corresponding to the original data based on a component of each piece of dictionary data and a value of the weight.

The regeneration error check S134 may be an operation of obtaining a difference between generated data and the original data.

This means that a small regenerating error can precisely express the original data by a dictionary and the value of the weight.

A motion flow according to an embodiment of the present invention may be performed as follows.

The motion flow according to an embodiment may be performed as follows.

When supposing that an original video sequence is Ĩ(x,y, t), Ĩ(x,y,t) represents a standardized facial motion video sequence.

(x(t), y(t)) may be a trajectory of a point which is located in an image plane and be a trajectory at a time t of a point (x, y) which is located in the image plane, and a motion flow satisfying the following Equation 1 may be estimated based on brightness invariability.

$$\frac{d}{dt} I(x(t), y(t), t) = 0 \qquad \text{[Equation 1]}$$

Further, a sum µ of every change and the normalization operation of $L_1$ may be calculated by convex optimization in order to obtain a solution of a linear system as intended.

The dictionary learning according to an embodiment of the present invention may represent the motion flow of the facial expression from the video sequence as a result of a collection of $\mu(x,y,t)=(\mu_1(x,y), \mu_2(x,y),t)$.

The motion flow sequence may not be influenced by a change of lighting and a skin color of an object.

When a size of the standardized flow of the image is P (P=w×h), the frame number is represented as N, and a tensor of the collected data is represented as P×M×N.

Here, in a two-dimensional image sequence, M is 2 (that is, an X axis motion component and a Y axis motion component are included).

A data set may be represented by a matrix X, and a size may be represented by PM×N using a tensor development. (The tensor development is referenced from "a multilinear singular value decomposition" disclosed in SIAM Journal On Matrix Analysis and Applications, vol. 21, no. 4, pp. 1253~1278, 2000, by Lathauwer, Bart de Moor, and Joos Vandewalle)

A method proposed in an embodiment of the present invention may be performed by disassembling a captured motion flow sequence as a sparse and localized motion dictionary component.

The dictionary learning of the motion flow for the data matrix X may represent a sparse expression of data by the following Equation 2.

$$\min_{D, A} \sum_{i=1}^{N} \|x_i - D\alpha_i\|_F^2 + \lambda \sum_{i=1}^{P} \|\alpha_i\|, \quad \text{[Equation 2]}$$

According to an embodiment of the present invention, the dictionary learning method may expand by adding an additional limiting condition D like the following Equation 3. Here, represents a j-th dictionary component.

(The additional limiting condition is referenced from "Optimization with sparsity-inducing penalties" disclosed in Foundations and Trends in Machine Learning, vol. 4, no. 1, pp. 1-106, 2012, by Francis Bach, Rodolphe Jenatton, Julien Mairal, and Guillaume Obozinski.)

$$\min_{D, A} \sum_{i=1}^{N} \|x_i - D\alpha_i\|_F^2 + \lambda \sum_{i=1}^{P} \|d_j\|, \quad \text{[Equation 3]}$$

$$s.t. \max(\alpha_i)=1 \cdot \alpha_i \geq 0 \quad \text{[Equation 4]}$$

A matrix factorization may be formularized as a standardized minimization problem.

The limiting condition on a weight $\alpha_i$ may be required in order to prevent the motion flow component from being obtained from an arbitrary small point and very large image.

According to an embodiment of the present invention, two factors for finding a normalization suitable for a localized motion component may be calculated.

First, a row of D may form two spatial coordinates.

$$d_k^{(j)}=[\mu_1(x,y),\mu_2(x,y)]_k^{(j)} \quad \text{[Equation 5]}$$

Each component k may correspond to X axis and Y axis motion components.

Accordingly, it may be necessary to consider an initial group structure.

According to an embodiment of the present invention, a norm of $l_1/l_2$ may be used for representing group scarcity.

Next, in order to deduce a facial motion based on a motion flow which is locally generated, each motion flow dictionary based on a set of local regions may be applied.

A final object function follows the following Equation 6.

The dictionary learning for the motion flow according to an embodiment of the present invention may be obtained by a method of obtaining an optimal value on an object function of the following Equation 6.

The dictionary learning for the motion flow according to an embodiment of the present invention may be obtained by a method of obtaining an optimal value on the object function of the following Equation 6.

$$\min_{D, \alpha} \sum_{i=1}^{N} \|x_i - D\alpha_i\|_2^k + \sum_{k=1}^{K} \sum_{j=1}^{M} \Lambda_{ki} \|d_k^{(j)}\|_2 \quad \text{[Equation 6]}$$

$$s.t. \max(\alpha_i) = 1, \alpha_i \geq 0$$

Here, D is a numerical value to be obtained, $\alpha_i$ represents an i-th weight vector, and $d_k^{(j)}$ represents a j-th motion dimension in a k-th dictionary.

Here, the dictionary may be a component for representing learning data, and represents a component analysis method for effectively representing the learning data like a principle component analysis.

Further, the dictionary represents a basic component of the sparse and localized facial motion.

K represents the number of dictionaries which is set (here, the number of dictionaries represents the number of components for representing the learning data), and M represents a dimension of a gesture and represents two dimensions of the X axis and the Y axis with respect to two dimensional image, in this case, M=2.

$x_i$ represents i-th expression-gesture data, and N represents the amount of gesture data used for the learning. $\Lambda_{ki}$ represents a local support map in the k-th dictionary for an i-th sample.

Figure 2:
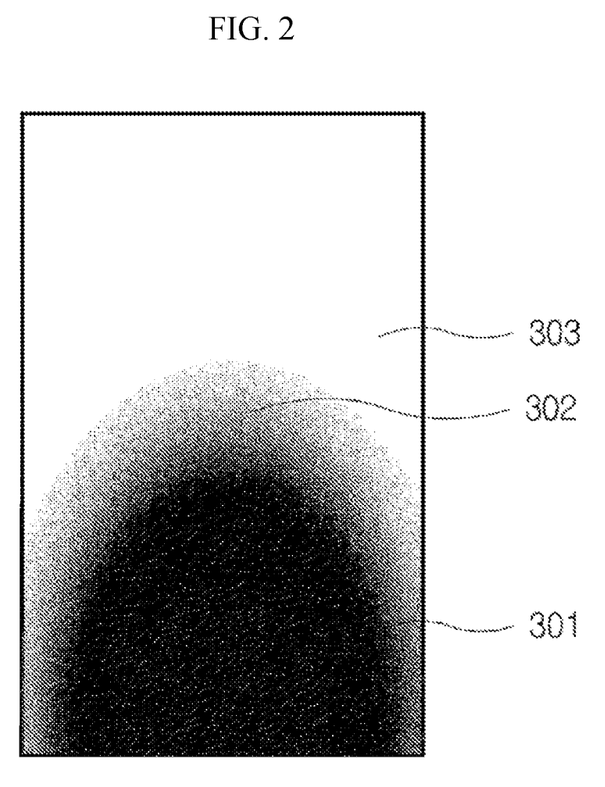
FIG. 2 is a diagram illustrating an example of a local support map according to an embodiment of the present invention.

FIG. 2 is a diagram illustrating an example of a local support map according to an embodiment of the present invention.

The local support map may be configured based on a distance from a position given in image spatial coordinates.

For example, when two kinds of expressions of anger and joy are assumed, gesture-expression dictionaries which represent anger well among all of data including every expression are $D_a$, $D_b$, $D_c$, and gesture-expression dictionaries which represent joy well are $D_i$, $D_j$, $D_k$, data related to the expression of anger among all of the dictionaries may have high weights corresponding to the expression-gesture dictionaries $D_a$, $D_b$, $D_c$, and when obtaining weights of the dictionaries on data related to the expression of joy, data related to the expression of joy may have high weights corresponding to the expression-gesture dictionaries $D_i$, $D_j$, $D_k$.

There may be the dictionaries which are commonly used for anger and joy by an actual dictionary learning, the dictionaries may be automatically generated in the process of optimizing the object function, and in an actual recognition operation, only weight on a fixed dictionary may be obtained, and different expressions may be recognized. The weight may be learned to have a value of 0 to 1.

A gesture dictionary D may represent learning data on an original dense motion by combining gesture dictionary components, and a size of a dimension of the gesture dictionary and a size of the dimension of the learning data may be the same.

Figure 3:
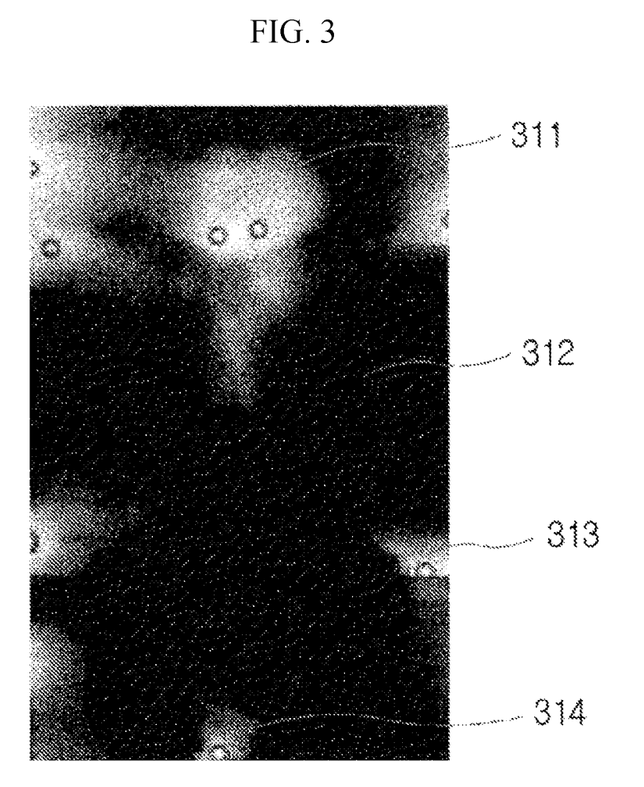
FIG. 3 is a diagram illustrating an example of a center position of a local support map which is automatically generated according to an embodiment of the present invention.

FIG. 2 illustrates an example of the local support map, and FIG. 3 is a diagram illustrating an example of a center position of a local support map which is automatically generated according to an embodiment of the present invention.

FIG. 2 is an example of the local support map, and FIG. 3 is an example of configuring the local support map based on 314. That is, in order to recognize local motions based on a position 314 shown in FIG. 3, a high weight may be given in a position 301 close to the position 314, and a weight may not be given in a position 303 since weight is decreased as a position is far away from the position 314 toward a position 302.

Accordingly, in a dictionary learning error, a dictionary component influenced by a limitation on the local support map shown in FIG. 2 may find components representing local expression motions based on the position 314 shown in FIG. 3.

An initial value for the local support map may be set in order to reduce the amount of change from a great variance value based on variance on all of the learning data, and an optimal position value may be obtained through learning.

In the local support map shown in FIG. 2, like FIG. 3, a method of calculating an arbitrary weight having a value of 1 in the center and having a value of 0 at a predetermined distance, that is, a distance far away by as much as ad from local center points found based on a point having the great variance in the data, may be used.

In an embodiment of the present invention, a local support map in which a weight of a space which is far away by as much as ad from the center is represented as 1, and after this, a weight of a space which is from ad to md linearly decreases from 1 to 0 may be configured and used.

The local support map may be an arbitrary local support map having the weight of 1 in the center, and having the weight of 0 at a predetermined distance or more.

According to an embodiment of the present invention, in order to obtain an optimal value for Equation 6, a repetitive learning may be performed.

According to an embodiment of the present invention, when the expression-gesture dictionary D is given, Equation 6 may be used to obtain an optimal $\alpha_i$ for Equation 7 below. In this case, the optimal $\alpha_i$ may be obtained by a limited linear minimum square method.

$$\min_{D, \alpha} \sum_{i=1}^{N} \|x_i - D\alpha_i\|_F^2 + \sum_{k=1}^{K} \sum_{j=1}^{M} \Lambda_{ki} \|d_k^{(j)}\|_2 \quad \text{[Equation 7]}$$

$$\text{s.t. } \max(\alpha_i) = 1, \alpha_i \geq 0$$

In an embodiment of the present invention, a local support range may be defined by a range $[S_{min}, S_{max}]$ in the center of each motion flow component.

According to an embodiment of the present invention, a spatial support region may be linearly mapped within a range [0, 1] for normalization within a previously defined range.

Further, according to an embodiment of the present invention, when a collection of weight matrix values which are given is referred to as A, D which is a dictionary numerical value for the given A may be obtained by Equation 3. (This may be performed by a convex optimization method.)

In order to optimize a $l_1/l_2$ norm regularizer, an alternative direction method of multipliers (ADMM) [29] may be provided. (ADMM is referenced from "Distributed optimization and statistical learning via the alternating direction method of multipliers" disclosed in Found. Trends Mach. Learn. by Stephen Boyd, Neal Parikh, Eric Chu, Borja Peleato, and Jonathan Eckstein.)

According to an embodiment of the present invention, the optimization may be rewritten in a compatibility form of ADMM like following equation by adopting a dual variable $Z \in \mathbb{R}^{K \times 2P}$.

$$\operatorname*{argmin}_{D, Z} \|X - A \cdot D\|_F^2 + \Omega(Z) \quad \text{[Equation 8]}$$

$$\text{s.t. } D - Z = 0, \Omega(Z) = \sum_{k=1}^{K} \sum_{j=1}^{M} \Lambda_{ki} \|z_k^{(j)}\|_2$$

Here, X represents a set of Xs corresponding to the dense learning data in Equation 6 described above.

Here, Z is an additional variable used for solving the optimization problem. D-Z=0 may refer to an optimization algorithm which solves a problem of obtaining an original D by dividing the original D into D and Z and equalizing D and Z.

That is, the expression classifier learner 40 may classify the expression based on a combination of a weight and a dictionary generating motion in each sequence.

The simplest classification operation may obtain a frame representing a combination of the closest dictionaries for arbitrary test data. After this, a method of recognizing an expression having the largest number in the given sequence using a kind of the expression represented in an obtained frame as the expression of the given frame may be implemented as the simplest recognition method.

Figure 4:
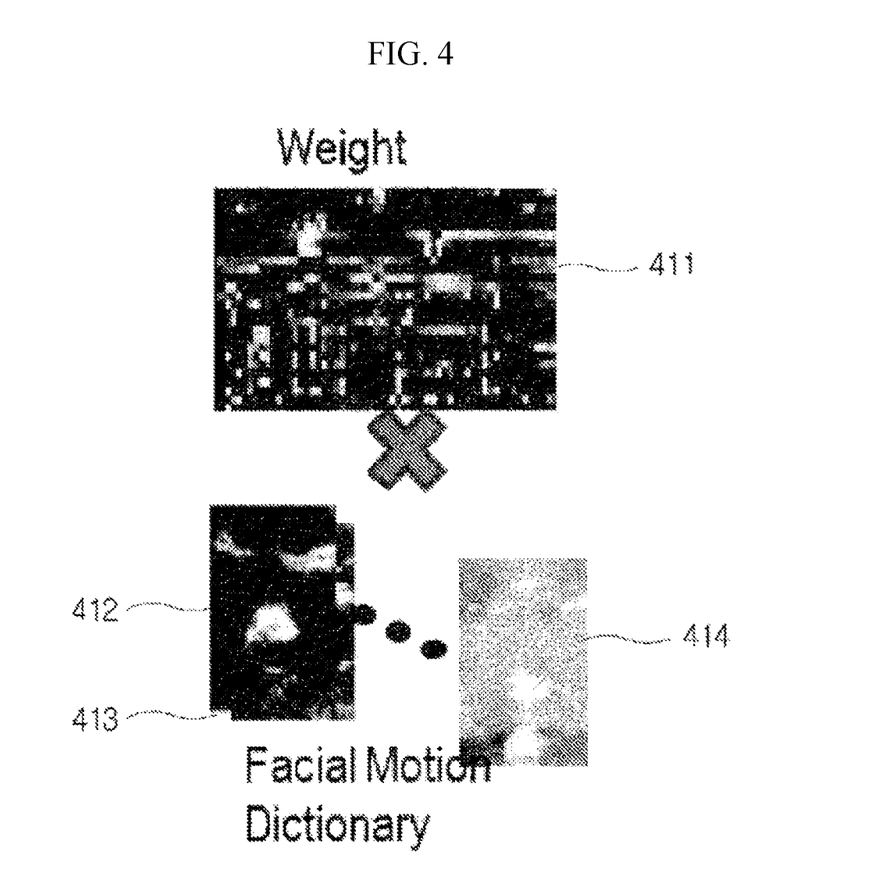
FIG. 4 is a diagram for describing an operation of generating original learning data by a sum of a weight and an expression-gesture dictionary in an expression-gesture dictionary learning operation according to an embodiment of the present invention.

FIG. 4 is a diagram for describing an operation of generating original learning data by a sum of a weight and an expression-gesture dictionary in an expression-gesture dictionary learning operation according to an embodiment of the present invention.

Referring to FIGS. 4, 412 to 414 refer to dictionaries learned for representing an expression, and 411 represents a weight to be multiplied with the dictionary.

In the dictionary learning, a weight represents a sparse value in which a lot of weight values have 0.

Original learning data may be regenerated by the expression-gesture dictionary and its weight obtained by learning as shown in FIG. 4 for given learning data. In the dictionary learning operation, the dictionary component and the weight may be learned and stored.

Figure 5:
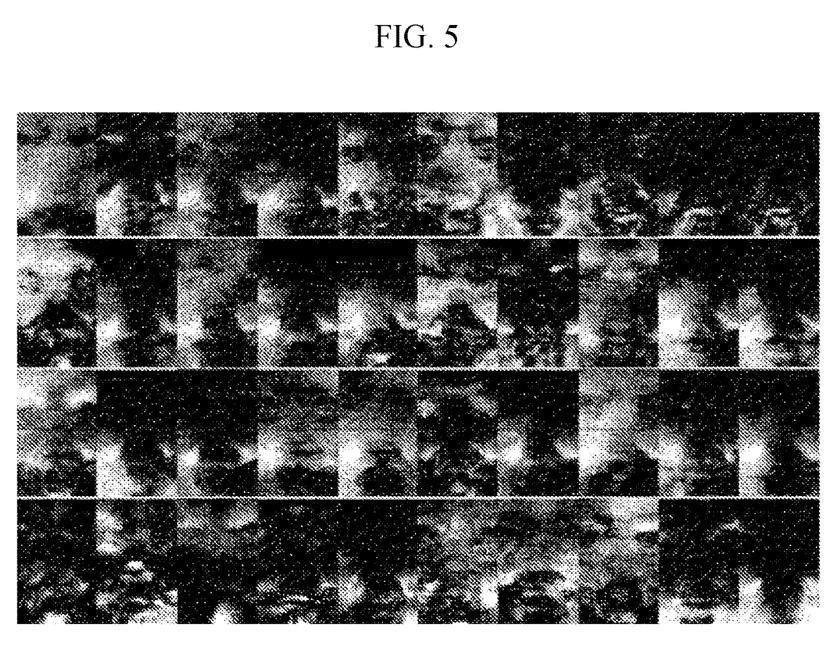
FIG. 5 is a diagram illustrating an example of a dictionary expressed according to a size of a gesture in a learned local expression-gesture dictionary.

FIG. 5 is a diagram illustrating an example of a dictionary expressed according to a size of a gesture in a learned local expression-gesture dictionary.

Referring to FIG. 5, each picture represents a spot of local brightness of each dictionary component.

A brighter intensity means a strong motion flow.

In FIG. 5, when an example of the learned dictionary is considered, a portion having a bright color represents a portion having a large gesture, and a portion having a dark color represents a portion in which there is not a large gesture. Referring to FIG. 5, it may be seen that a portion having a large gesture is locally shown.

According to another embodiment of the present invention, a recognition apparatus may be implemented based on a time-series weight value through a latent support vector machine (SVM) by expanding the above-described embodiment of the present invention.

The recognition image acquisitor 20 may obtain recognition data having positions of a face and the eyes in the same manner as a method of obtaining normalized data used for learning in order to recognize an expression from a given image sequence (S121).

The recognition image acquisitor 20 may perform a normalization operation S122 based on the positions of the eyes from the obtained data. (The recognition normalization operation S122 may be performed in the same method as a learning normalization operation S112.)

A change of dense motion may be tracked from a previous image or a neutral expression image in a normalized image 123.

Further, the expression recognizer 50 may estimate a dictionary weight on test data based on an expression-gesture dictionary which is previously learned (S151).

The dictionary weight may be obtained by a pseudo inverse matrix.

In an embodiment of the present invention, the dictionary weight may be calculated through an optimization routine for satisfying the condition shown Equation 1.

Next, the expression recognizer 50 may recognize the expression through a learning classifier 142 learned by the expression classification learner 40 using the obtained weight.

According to an embodiment of the present invention, when a sequence of starting from a neutral expression and returning to the neutral expression after making a specific expression is defined, and it is possible to know that there is important information in a predetermined portion or it is possible to give weight on importance based on an amount of change from an average expression or a neutral expression, it may be possible to apply the weight on time-series data based on this situation.

Further, performance of the recognition of an expression may be improved by applying the weight.

Moreover, in a method of effectively performing the present invention, a desired weight may be applied using a kernel of a radial basis function (RBF) after normalizing a sequence index as a value between 0 and 1 based on a length of the time-series data.

For example, when returning to a neutral expression after making a specific expression from a neutral expression, a sequence which is located in the center may be an important variable.

Accordingly, the weight may be applied on the data by applying an RBF kernel having a kernel in a position of a sequence index 0.5 having a great weight in the center of the sequence, and the performance of the recognition of an expression may be improved by applying not only an expression recognized in each frame but also its weight to majority voting.

The above description is merely of exemplary embodiments of the scope of the present invention, and it should be apparent to those skilled in the art that various modifications can be made to the above-described exemplary embodiments of the present invention without departing from the spirit or the scope of the invention. Accordingly, exemplary embodiments of the present invention are not intended to limit the scope of the invention but to describe the invention, and the scope of the present invention is not limited by the exemplary embodiments. Thus, it is intended that the present invention covers all such modifications provided they come within the scope of the appended claims and their equivalents.

The invention claimed is:

1. An apparatus for recognizing an expression using an expression-gesture dictionary, the apparatus comprising:
   a learning image acquisitor configured to obtain position data of a face and eyes from a learning expression, perform a first normalization based on the obtained position data, track a change of a dense motion of the learning expression from a reference frame of a neutral expression, and generate expression learning data;
   an expression-gesture dictionary and expression-gesture dictionary learner configured to represent and store a numerical value for expression recognition for each expression according to a dictionary learning method satisfying a given limiting condition using a local support map in an image coordinate space for a motion flow with respect to a set of changes of the dense motion of the learning expression after initializing the expression-gesture dictionary;
   an expression classifier learner configured to learn an expression classification for each expression based on a weight of data on the expression-gesture dictionary;
   a recognition image acquisitor configured to obtain position data of a face and eyes from a recognition target, perform a second normalization based on the obtained position data, track a change of a dense motion of the recognition target from the reference frame of the neutral expression, and generate recognition data; and
   an expression recognizer configured to analyze an expression weight on data to be recognized, determine a closest classification by the expression classifier learner, and recognize an expression,
   wherein the first normalization removes a peripheral region regardless of an expression in a facial region by giving an offset as a predetermined ratio based on positions of two eyes after aligning a center of the two eyes to be a reference point based on positions of the two eyes which are detected, and sets a position coordinate of a feature portion.

2. The apparatus for recognizing the expression using the expression-gesture dictionary of claim 1, wherein the expression-gesture dictionary learner obtains the numerical value for expression recognition by a method of obtaining an optimal value for an object function of Equation 1 according to a dictionary learning method, $$\min_{D,\alpha} \sum_{i=1}^{N} \|x_i - D\alpha_i\|_2^K + \sum_{k=1}^{K} \sum_{j=1}^{M} \Lambda_{ki} \|d_k^{(j)}\|_2 \quad \text{[Equation 1]}$$

s.t. $\max(\alpha_i) = 1$, $\alpha_i \geq 0$.

(Here, D is a numerical value of a dictionary to be obtained, $\alpha_i$ represents an i-th weight vector, $d_k^{(j)}$ represents a dimension of a j-th motion in a k-th dictionary column, K is the number of dictionaries which is set, M is a dimension of a gesture motion, $x_i$ is i-th motion data, N represents the amount of motion data used for learning, and $\Lambda_{ki}$ is a local support map in the k-th dictionary for an i-th sample).

3. The apparatus for recognizing the expression using the expression-gesture dictionary of claim 1, wherein the expression-gesture dictionary learner obtains an optimal weight $\alpha_i$ by Equation 2 when a numerical value D of the expression-gesture dictionary is given, $$\min_{D,\alpha} \sum_{i=1}^{N} \|x_i - D\alpha_i\|_F^2 + \sum_{k=1}^{K}\sum_{j=1}^{M} \Lambda_{ki}\|d_k^{(j)}\|_2 \quad \text{[Equation 2]}$$

$$\text{s.t. } \max(\alpha_i) = 1, \alpha_i \geq 0.$$

(Here, $d_k^{(j)}$ represents a j-th motion dimension in a k-th dictionary column, K is the is number of dictionaries which is set, M is a dimension of a motion, $x_i$ i-th motion data, N represents the amount of motion data used for learning, and $\Lambda_{ki}$ represents a local support map in the k-th dictionary for an i-th sample).

4. The apparatus for recognizing the expression using the expression-gesture dictionary of claim 1, wherein, when a collection of given weight values is referred to as A, the expression-gesture dictionary learner obtains a numerical value D of the expression-gesture dictionary by Equation 3, $$\underset{D,Z}{\operatorname{argmin}} \|X - A \cdot D\|_F^2 + \Omega(Z) \quad \text{[Equation 3]}$$

$$\text{s.t. } D - Z = 0, \Omega(Z) = \sum_{k=1}^{K}\sum_{j=1}^{M} \Lambda_{ki}\|z_k^{(j)}\|_2.$$

5. A method for recognizing an expression using an expression-gesture dictionary, comprising:
  obtaining a learning image including obtaining position data of a face and eyes from a learning expression, performing a first normalization based on the obtained position data, tracking a change of a dense motion from a reference frame of a neutral expression, and generating expression learning data;
  learning an expression-gesture dictionary including representing and storing a numerical value for expression recognition for each expression according to a dictionary learning method satisfying a given limiting condition using a local support map in an image coordinate space for a motion flow with respect to a set of changes of the dense motion for the learning expression after initializing the expression-gesture dictionary;
  learning an expression classifier including learning an expression classification for each expression based on a weight of data on the expression-gesture dictionary;
  obtaining a recognition image including obtaining position data of a face and eyes from a recognition target, performing a second normalization based on the obtained position data, tracking a change of a dense motion from the reference frame of the neutral expression, and generating recognition data; and
  recognizing an expression including analyzing an expression weight on data to be recognized, determining a closest classification by the expression classifier learner, and recognizing an expression,
  wherein the first normalization removes a peripheral region regardless of an expression in a facial region by giving an offset as a predetermined ratio based on positions of two eyes after aligning a center of the two eyes to be a reference point based on positions of the two eyes which are detected, and sets a position coordinate of a feature portion.

6. The method for recognizing the expression using the expression-gesture dictionary of claim 5, wherein the learning of the expression-gesture dictionary further comprises:
  estimating a dictionary weight after initializing the expression-gesture dictionary,
  wherein the estimating of the dictionary weight is performed based on a regeneration error test, and
  the regeneration error test obtains a combined weight of dictionary data obtained through dictionary learning and dictionary data on given original data, generates estimation data corresponding to the original data based on a component of each dictionary data and a value of the obtained combined weight, and obtains a difference between the estimation data and the original data.

7. The method for recognizing the expression using the expression-gesture dictionary of claim 5, wherein the learning of the expression-gesture dictionary obtains the numerical value for expression recognition by a method of obtaining an optimal value for an object function of Equation 1 according to a dictionary learning method, $$\min_{D,\alpha} \sum_{i=1}^{N} \|x_i - D\alpha_i\|_2^K + \sum_{k=1}^{K}\sum_{j=1}^{M} \Lambda_{ki}\|d_k^{(j)}\|_2 \quad \text{[Equation 1]}$$

$$\text{s.t. } \max(\alpha_i) = 1, \alpha_i \geq 0.$$

(Here, D is a numerical value of a dictionary to be obtained, $\alpha_i$ represents an i-th weight vector, $d_k^{(j)}$ represents a dimension of a j-th motion in a k-th dictionary column, K is the number of dictionaries which is set, M is a dimension of a motion, $x_i$ is i-th expression-gesture data, N represents the amount of motion data used for learning, and $\Lambda_{ki}$ is a local support map in the k-th dictionary for an i-th sample).

\* \* \* \* \*